Feb. 19, 1935.  F. W. WOOD  1,991,439
CHICKEN STEAK MACHINE
Filed March 22, 1932
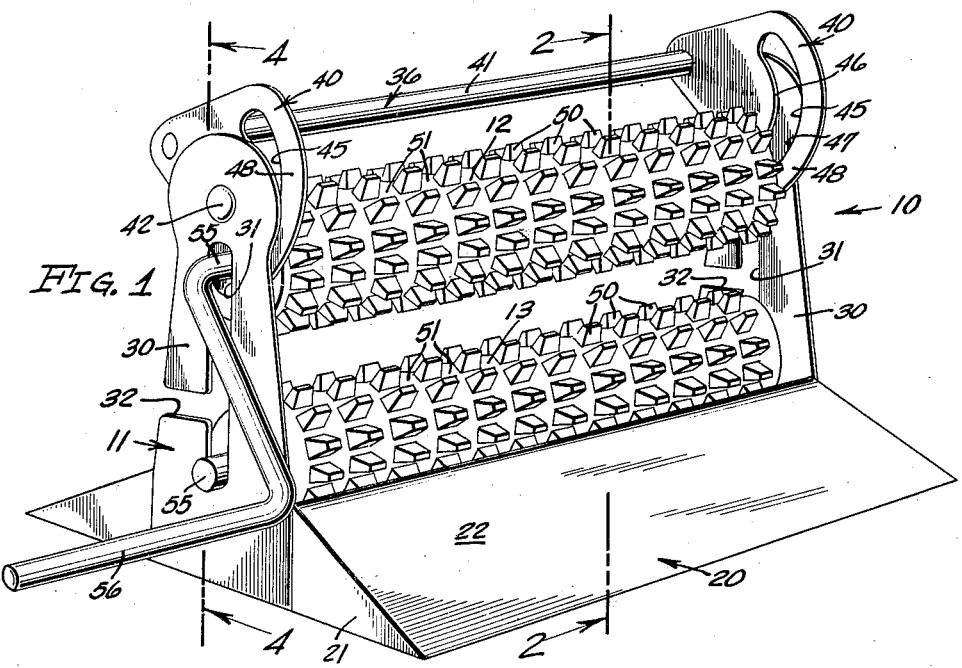
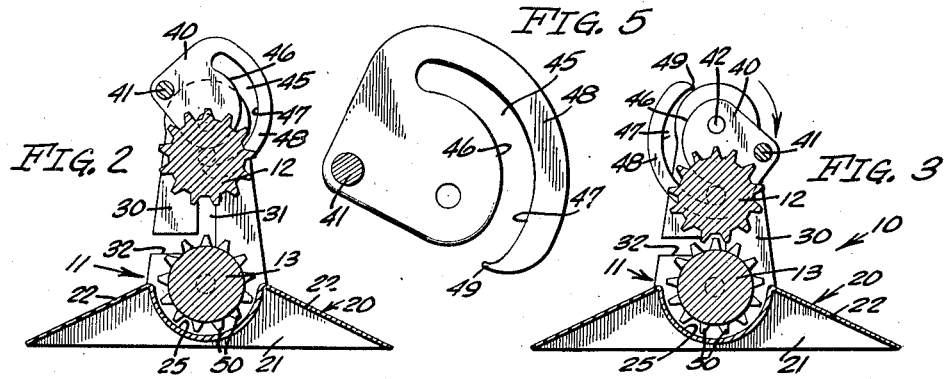
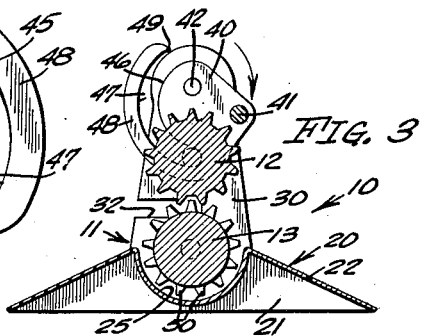
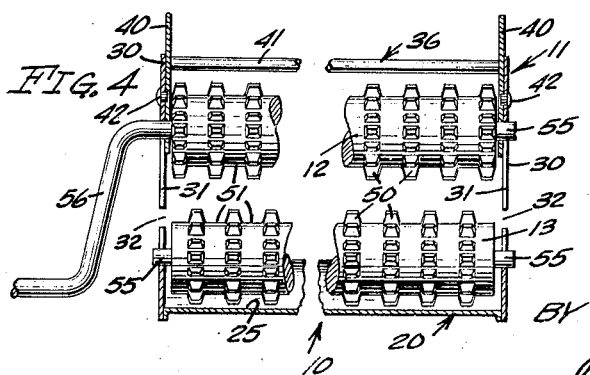
INVENTOR
FRANKLYN W. WOOD
ATTORNEY Patented Feb. 19, 1935

1,991,439

UNITED STATES PATENT OFFICE 1,991,439

CHICKEN STEAK MACHINE

Franklyn W. Wood, San Diego, Calif.

Application March 22, 1932, Serial No. 600,386

12 Claims. (Cl. 17—26)

My invention relates to meat tendering machines, and more particularly to machines which break down the tissues of tough meat without chopping or cutting the same. Practice has taught that the flavor of steak is better when the cells of the meat have not been broken. When meat is ground up the flavor is changed and the meat is partially dried due to the liberation of juices from the crushed meat cells.

It is an object of my invention to provide a machine which will break down the tissues of the meat making the same tender without crushing the cellular structure to the point of liberating the juices contained therein.

Further objects of my invention are to provide a machine which is very easily adjustable to varying thickness of meat; to provide a machine which can be quickly and easily taken apart for cleaning, and to provide a machine of novel design which can be manufactured at a very low cost.

Further objects and advantages will be made manifest in the following description taken in connection with the accompanying drawing, in which:

Fig. 1 is a perspective view of a preferred embodiment of my invention.

Fig. 2 is a reduced vertical sectional view taken on line 2—2 of Fig. 1.

Fig. 3 is a view similar to Fig. 2 illustrating the adjustability of my invention.

Fig. 4 is a reduced fragmentary sectional view taken on line 4—4 of Fig. 1.

Fig. 5 is an enlarged view of one of the cams included in my invention.

Referring specifically to the drawing, a meat tendering machine 10 comprising a preferred embodiment of my invention is shown in Fig. 1, this machine including a frame 11 and a pair of rollers 12 and 13.

The frame 11 has a sheet metal base 20 with end walls 21, inclined top surfaces 22 and a semi-circular channel 25 coextensive longitudinally with the surfaces 22. Fixed to walls 21 of the base 20 are a pair of identical upstanding roller supporting standards 30 which are provided with vertical slots 31 and horizontal slots 32.

Pivotally mounted on the upper ends of the standards 30 is a roller adjusting device 36. This device includes identical cam plates 40 which are rigidly secured to opposite ends of a tie rod 41. These cam plates are pivotally connected to the standards 30 by rivets 42.

As shown in Fig. 5, each cam plate 40 is provided with a spiral slot 45 having inner and outer cam faces 46 and 47 respectively. The slot 45 is provided near an edge of the cam plate so as to form a spring-like finger 48 on the side of the slot providing the cam face 47. The slot 45 is preferably of uniform width excepting at the mouth thereof where it is slightly restricted by the provision of an inturned projection 49 on the finger 48.

The rollers 12 and 13 are somewhat similar in shape having circumferential rows of teeth 50 interspaced by circumferential grooves 51 which are slightly wider than the teeth 50, it being noted that the teeth of one roller are disposed opposite the grooves of the other roller as shown in Fig. 4. Provided at either end of the rollers 12 and 13 are suitable trunnions 55, one of the trunnions on the roller 12 being comparatively long and formed into a crank 56.

The machine 10 is assembled by sliding the trunnions of one roller such as the roller 12 through the slots 32 to the upper ends of the vertical slots 31. The operator holds the roller 12 in this position while rotating the cam plates 40 by means of the tie rod 41 until the restricted openings of the spiral slots 45 are snapped over the trunnions 55. The roller 12 is now held in position by the trapping of its trunnions 55 in the vertical slots 31 of the standards 30 and the spiral slots 45 of the cam plates 40.

The roller 13 is now installed by sliding the trunnions 55 through the horizontal slots 32 and allowing them to gravitate to the bottoms of the slots 31 in which position the roller 13 is concentrically supported with respect to the semi-circular channel 25 of the base 20. As shown in Fig. 1, the roller 13 is mounted at the bottom of the machine and the roller 12 is mounted at the top thereof with the crank 56 positioned to be rotated without striking the surface of a table upon which the machine might be resting. The positions of the rollers may, however, be interchanged providing the machine is placed with the crank 56 overhanging the edge of a table so that less effort will be required to support the machine as the power is applied at an axis relatively close to the base of the machine. The machine 10 can be taken apart for cleaning by reversing the procedure above described incidental to the assembly of the machine.

The operation of my invention in the process of tendering a piece of steak is as follows:

Supposing the device 10 to be supported on a suitable table, not shown, one end of a piece of steak to be treated, not shown, is inserted between the rollers 12 and 13. The operator grasps the rod 41 and rotates the cam members 40 in the direction of the arrow on Fig. 3. The spiral slots 45 of the cam members 40 lower the upper roller in parallel relation with the lower roller until the steak is firmly held between the toothed rollers. The operator then turns the crank 56 thus rotating the roller 12 and the steak is drawn through the machine 10, and the fibers of the meat are subjected to the crushing action of the toothed faces of the rollers. It will be noted that the rotary motion given the roller 12 by manual operation of the crank 56 is transmitted to the roller 13 by the meat which is being treated.

What I claim is:

1. In a meat tendering machine, the combination of: a frame, said frame including a pair of upstanding plates, said plates having vertical slots and having openings communicating with said vertical slots; a pair of toothed rollers having trunnions at either end thereof, which extend into said vertical slots; cam plates mounted on said upstanding plates, said cam plates having spiral slots therein, said cam slots receiving the trunnions of one of said rollers and controlling the vertical movement of said roller with respect to the other roller; means on said cam plates for manually controlling said plates; and means on one of said toothed rollers for rotating said roller.

2. In a meat tendering machine, the combination of: a frame, said frame including a pair of parallel plates, a longitudinal slot provided in each of said plates, a transverse open slot provided in each of said plates, said transverse slots communicating with said longitudinal slots; a pair of toothed rollers provided with trunnions at either end thereof, said rollers being adapted to be rotatably mounted between said parallel plates; cam plates pivotally mounted on said parallel plates, said cam plates being provided with spiral slots adjacent edges thereof, said spiral slots being provided with mouths for reception of trunnions of one of said toothed rollers, the portions of said cam plates adjacent the outer edge of said spiral slots comprising spring fingers, said fingers being provided at their ends with protuberances positioned to slightly restrict the width of said mouths of said spiral slots, said restriction necessitating slight pressure to be applied incidental to the engagement or disengagement of said spiral slots with said trunnions of said toothed roller; means on said cam plates for manually rotating them in unison; and means for manually rotating one of said toothed rollers.

3. In a meat tendering machine, the combination of: a frame; toothed rollers having trunnions at opposite ends thereof, said frame having slots which rotatably receive said trunnions; cam means having slots therein, said cam slots being adapted to receive the trunnions of one of said rollers and positively lock said trunnions in a given position in said frame slots; and spring means for yieldably resisting removal of said trunnions from said cam slots.

4. In a meat tendering machine the combination of: a frame including a pair of side plates having corresponding slots therein; a pair of toothed rollers having trunnions rotatably mounted in said slots; and self locking adjustment cams pivotally mounted on said side plates on centers substantially in line with said slots and having spiral cam faces engaging the trunnions of one of said rollers to positively retain that one of said rollers in any one of a plurality of positions relative to the other of said rollers during the operation of said machine.

5. In a meat tendering machine the combination of: a frame including a pair of side plates having corresponding slots therein, said slots being provided with openings; a pair of toothed rollers having trunnions adapted to enter said slots through said openings so that said rollers are thus rotatably mounted in said slots; and self locking adjustment cams pivotally mounted on said side plates on centers substantially in line with said slots and having spiral cam faces engaging the trunnions of one of said rollers to positively retain that one of said rollers in any one of a plurality of positions relative to the other of said rollers during the operation of said machine, said cams being rockable to cause said cam faces to disengage said trunnions and permit said trunnions to be moved out of said slots through said openings.

6. In a meat tendering machine the combination of: a frame including a pair of side plates having corresponding slots therein, said slots being provided with openings; a pair of toothed rollers having trunnions adapted to enter said slots through said openings so that said rollers are thus rotatably mounted in said slots by the confining of said trunnions therein; and a pair of self locking adjustment members pivotally mounted on said side plates on centers substantially in line with said slots, said members being rockable to dispose portions thereof across said slots to positively obstruct the removal of the trunnions of one of said rollers therefrom.

7. In a meat tendering machine, the combination of: a frame; toothed rollers having trunnions at opposite ends thereof, said frame having slots which rotatably receive said trunnions; cam means pivotally mounted on said frame on centers disposed close to said slots, said cam means having spiral slots therein, said cam slots being adapted to receive the trunnions of one of said rollers and positively lock said trunnions in a given position in said frame slots; and spring means for yieldably resisting removal of said trunnions from said cam slots.

8. In a meat tendering machine, a frame including a pair of parallelly disposed plate members having alined journal slots therein intersected intermediate their ends by a lateral aperture, a pair of cam members pivotally mounted on said plate members, each having a cam slot open at one of its extremities and positioned to traverse the corresponding journal slot and shaped to vary its traversing point along the corresponding journal slot upon movement of the cam member, operating means common to said cam members, and a pair of toothed rollers each including trunnions at its extremities adapted to be inserted into said slots through said apertures, the trunnions of one of said rollers being further inserted through the open extremities of said cam slots, and the trunnions of the other roller being disposed in the extremities of said slots remote from said cam members.

9. In a meat tendering machine, a pair of parallel disposed frame members, having alined generally T-shaped journal slots each slot being open at the extremity of its leg portion, a pair of toothed rollers having trunnions adapted to journal in the cross arms of said T-shaped slots, cam plates journaled on said frame members, and operating means linking said cam plates, said cam plates each having a cam slot registering with one of said journal slots to receive the trunnion of one of said rollers, said cam slots being positioned in said cam plates to shift the corresponding roller along its journal slot upon movement of said cam plates, each of the cam slots being open at its one extremity to permit ready removal of the roller trunnions therefrom.

10. In a meat tendering machine, a frame including a pair of parallel disposed plate members having alined journalled slots therein each of which is intersected intermediate its ends by a lateral aperture, a pair of cam members pivotally mounted on said plate members, each having a cam slot open at one of its extremities and positioned to traverse said journal slots and shaped to vary its traversing point along the corresponding journal slot upon movement of its cam member, operating means common to said cam members, a pair of toothed rollers each including trunnions at its extremities adapted to be inserted into said slots through said apertures, the trunnions of one of said rollers being further inserted through the open extremities of said cam slots, and the trunnions of the other roller being disposed in the extremities of said slots remote from said cam members, and means associated with said cam slots tending to retain the trunnions of the corresponding roller in position relative to said cam slots.

11. In a meat tendering machine, a pair of parallel disposed frame members, having alined generally T-shaped journal slots open at the extremities of their leg portions, a pair of toothed rollers having a trunnion at each end adapted to journal in the cross arm of one of said T-shaped slots, cam plates journalled on said frame members, operating means linking said cam plates, said cam plates having cam slots registering with said journal slots to receive the trunnions of one of said rollers, said cam slots being positioned in said cam plates to shift the corresponding roller along its journal slots upon movement of said cam plates, each of the cam slots being open at one of its extremities to permit removal of the roller trunnions therefrom, and means associated with said cam slots tending to retain the trunnions of the corresponding roller in position relative to said cam slots.

12. In a meat tendering machine, a frame including a pair of parallel disposed plate members having alined journal slots therein each of which is intersected intermediate its ends by a lateral aperture, a pair of cam members adjustably mounted relative to said plate members, each of said cam members disposed with its cam portion traversing one of said journal slots, said cam portions being shaped to vary the traversing point along the corresponding journal slots upon movement of the cam members, operating means common to said cam members, and a pair of toothed rollers each including trunnions at its extremities adapted to be inserted in said slots through said apertures, the trunnions of one of said rollers being engageable with said cam members and the trunnions of the other roller being disposed in the extremities of said slots remote from said cam members.

FRANKLYN W. WOOD.